Patented Mar. 29, 1949

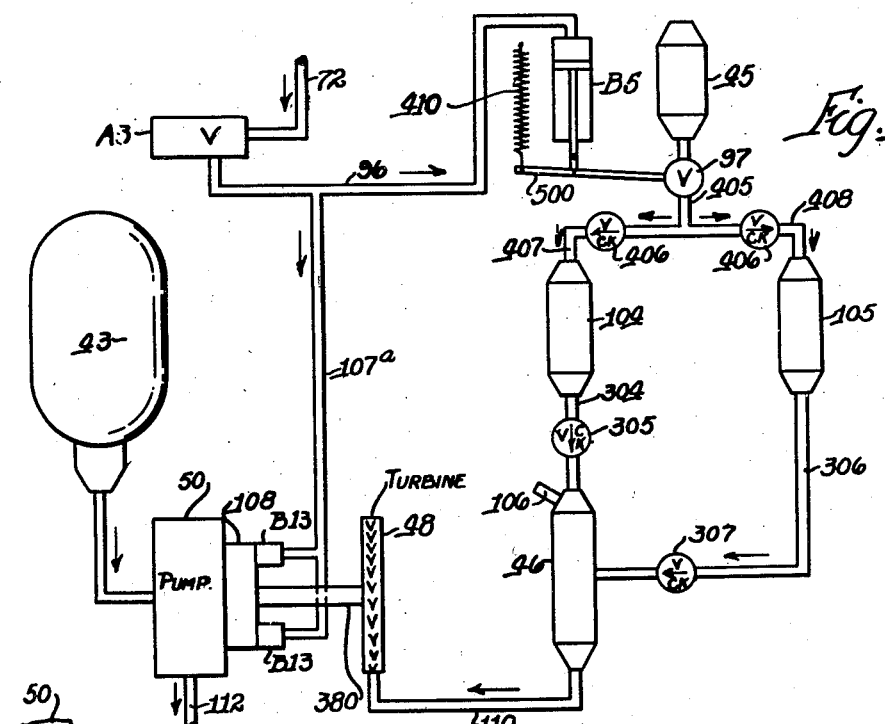
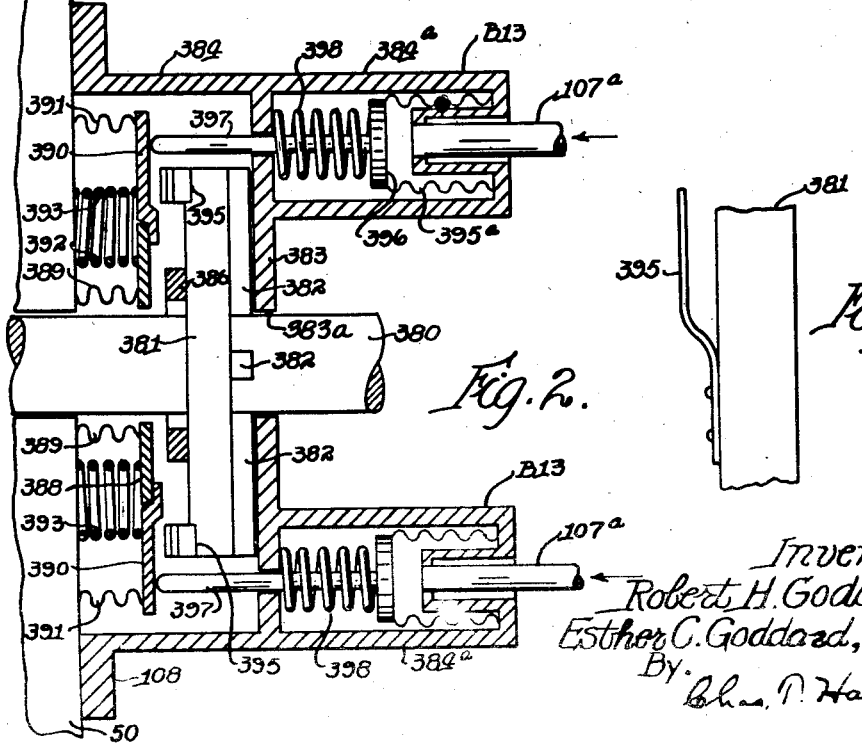

2,465,526

UNITED STATES PATENT OFFICE 2,465,526

PUMP SEALING MEANS

Robert H. Goddard, deceased, late of Annapolis, Md., by Esther C. Goddard, executrix, Paxton, Mass., assignor of one-half to the Daniel and Florence Guggenheim Foundation, New York, N. Y., a corporation of New York Original application July 29, 1942, Serial No. 452,754. Divided and this application February 14, 1946, Serial No. 647,606

3 Claims. (Cl. 103—87)

This application is a division of original application Serial No. 452,754, now Patent No. 2,397,659, filed July 29, 1942, on Control mechanism for rocket apparatus.

It is the general object of the invention set forth herein to provide improved auxiliary means for sealing a rotary pump against leakage when the pump is at rest and for releasing said auxiliary sealing means when the pump is placed in operation. The usual centrifugal means is provided to prevent leakage when the pump is running.

A further object of the invention is to provide improved control devices by which the auxiliary sealing means is automatically applied and released in predetermined relation to the operative condition of the pump.

Another feature of the invention relates to the provision of means for braking and slowing down the pump before full application of the auxiliary sealing means.

The invention further relates to arrangements and combinations of parts which will be hereinafter set forth and more particularly pointed out in the appended claims.

A preferred form of the invention is shown in the drawings, in which

Fig. 1 is a diagrammatic view of certain control devices for the pump sealing means;

Fig. 2 is a sectional side elevation of the pump sealing means; and

Fig. 3 is a side elevation of a portion of a sealing disc and of one of the flat spring braking members which are mounted thereon.

The details of construction of the improved pump sealing means are clearly shown in Fig. 2, where the sealing means 108 is associated with the shaft 380 of the pump 50, the parts being shown with the pump in running condition and it being understood that the sealing means has been released by the application of pressure through the pipes 107a.

The sealing means 108 comprises a disc 381 mounted on a pump shaft, as 380, and having radially disposed ribs 382 running with close clearance relative to a fixed plate 383 forming part of the casing 384 of the sealing means 108. The ribs 382, when rapidly rotated, act to repel by centrifugal force any liquid from the pump 50 which might escape through the opening 383a (Fig. 2) between the shaft 380 and the end portion 383 of the casing 384. When the pump 50 is at rest, the centrifugal sealing ribs 382 become inoperative and the auxiliary sealing means herein shown is provided to then prevent escape of liquid under pressure from the pump 50 through the opening 383a.

A sealing ring 386 of relatively small diameter is mounted on the inside of the disc 381 and rotates adjacent an inner plate 388, which loosely surrounds the shaft 380 and which is held from rotation by a bellows member 389.

An outer annular plate or disc 390 surrounds the plate 388 and overlaps the same at its inner edge, as clearly shown in Fig. 2. The plate 390 is held from rotation by a bellows member 391, and the plates 388 and 390 are pushed toward the rotated disc 381 by separate and concentric coil springs 392 and 393. Yielding flat spring members 395 (Fig. 3) are mounted on the inner face of the disc 381 and yieldingly engage the outer surface of the outer plate 390 before the sealing ring 386 engages the corresponding surface of the inner plate 388.

When the apparatus is at rest and there is no pressure in the branch pipes 107a, the sealing ring 386 and the inner plate 388 are in close yielding engagement and seal the opening around the shaft 380.

Bellows operators B13 are mounted in outward extensions 384a of the casing 384 and comprise bellows members 395a having movable end plates 396 attached to plungers 397. The bellows members 395a are normally compressed by springs 398.

When pressure is applied through the branch pipes 107a to the bellows members 395a, the plungers 397 are pushed against the outer plate 390 and move the non-rotated plates 390 and 388 away from the flat springs 395 and the sealing ring 386, and to the running position shown in Fig. 2. Subsequently, the shaft 380 is freely rotated and the radial ribs 382 provide the necessary sealing action by centrifugal force during such rotation.

When the speed of the pump is later substantially reduced, the pressure in the pipes 107a will be correspondingly reduced, as will be hereinafter explained. The plungers 397 are then withdrawn by their springs 398 and the outer plate 390 engages the rotating flat springs 395 and slows down the pump. The inner plate 388 then engages the sealing ring 386, thus effectively sealing the pump while it is idle.

The preliminary engagement and braking action of the flat rotating springs 395 against the non-rotated disc 390 when the pump is slowing down, and the delayed separation of these parts when the speed is increasing substantially decreases the wear on the sealing ring 386 and correspondingly prolongs the useful life of the sealing surface.

Fig. 1 shows diagrammatically certain parts of the control apparatus of the original application which relate particularly to applying and releasing the pump sealing means.

The pipes 107a (Fig. 2) previously described are connected to a pipe 96 which in turn is connected to a pressure supply pipe 72 through a control valve A3. When the valve A3 is opened by any suitable manual or mechanical means, pressure is admitted from the pipe 72 through the pipes 96 and 107a to expand the bellows members 395a and thus force the discs 390 and 388 away from the braking springs 395 and the sealing ring 386, thus freeing the pump 50.

At the same time, pressure in the pipe 96 is applied in the bellows operator B5 to depress the arm 500 which opens the valve 97, this opening movement being against the tension of a spring 410. When the valve 97 is opened, high pressure fluid from a pressure storage tank 45 is admitted to storage tanks 104 and 105 through a pipe 405, past check valves 406, and through branch pipes 407 and 408.

The tank 104 normally contains a liquid oxidizing agent and the tank 105 normally contains liquid fuel. When pressure is applied from the tank 45 as above described, the liquids in the tanks 104 and 105 are forced out through the pipes 304 and 306 and past the check valves 305 and 307 to a gas generator 46, in which the mixed combustibles are ignited by an igniter 106. Thereupon gas under pressure is promptly generated and is conveyed to a turbine 48 through a pipe 110.

The turbine 48 and pump 50 are thus started in operation immediately after the release of the auxiliary sealing means.

Conversely, when the valve A3 is closed, the spring 410 closes the valve 97, the pressure drops in the pipes 96 and 107a, the generator 46 ceases to operate for lack of combustible materials, the turbine 48 loses its power and the pump slows down as the bellows operators 395a are simultaneously deflated. The braking springs 395 are then engaged by the non-rotating disc 390 and the sealing ring 386 is thereafter engaged by the non-rotating sealing disc 388, all as previously set forth.

Having thus described the invention and the advantages thereof, it will be understood that the invention is not to be limited to the details herein disclosed, otherwise than as set forth in the claims, but that what is claimed is:

1. A rotary feed pump having a casing, a drive shaft and a turbine to drive said shaft, an annular plate loosely surrounding said shaft and positioned alongside said casing, a sealing connection between said plate and said casing, which connection prevents rotation of said plate but permits axial movement thereof, a sealing ring mounted on and rotatable with said pump shaft, a spring to press said plate axially against said sealing ring, driving apparatus for said pump, control means for said driving apparatus which is actuated by admission of fluid under pressure and which is thereby made effective to render said driving apparatus operative, a pipe to supply said fluid under pressure, releasing devices operable by fluid under pressure to move said plate out of contact with said sealing ring, and an open branch connection from said fluid supply pipe to said releasing devices, whereby fluid under pressure is supplied to said releasing devices when said turbine is rendered operative.

2. A rotary feed pump having a casing and a drive shaft, a disc mounted on and rotatable with said drive shaft, a sealing ring mounted on an inner portion of said disc, an annular sealing structure loosely surrounding said shaft and positioned alongside said casing, a sealing connection between said structure and said casing, which connection prevents rotation of said structure but permits axial movement thereof, spring means to press said structure axially against said sealing ring, a plurality of yieldable braking members mounted on an outer portion of said rotatable disc and engaging said non-rotated sealing structure when said structure is yieldingly moved axially toward said disc to engage said sealing ring and prior to such engagement of said ring, and pressure-operated means effective to move said sealing structure axially away from said disc to release said sealing structure from said braking members when said pump is operating.

3. A rotary feed pump having a casing and a drive shaft, an annular plate loosely surrounding said shaft and positioned alongside said casing, a sealing connection between said plate and said casing, which connection prevents rotation of said plate but permits axial movement thereof, a sealing ring mounted on and rotatable with said pump shaft, a spring to press said plate axially against said sealing ring, a second annular plate sealed to said casing and overlapping said first plate and held from rotation, a disc rotatable with said pump shaft, spring means to press said second plate toward said disc, yieldable braking members mounted on said disc and engaging said second plate when said second plate is yieldingly moved toward said disc, and pressure-operated means effective to move said second plate axially away from said disc to release said plate from said braking members when said disc and pump are in rapid rotation.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,695,320 | Carrier | Dec. 18, 1928 |
| 1,932,214 | Hurnschuch | Oct. 24, 1933 |
| 1,947,017 | McHugh | Feb. 13, 1934 |
| 2,077,038 | Carrier | Apr. 13, 1937 |